US012743984B2

(12) United States Patent

Lee et al.

(10) Patent No.: US 12,743,984 B2
(45) Date of Patent: Sep. 22, 2026

(54) DISPLAY DEVICE AND ELECTRONIC DEVICE INCLUDING DISPLAY DEVICE

(71) Applicant: Samsung Display Co., LTD., Yongin-si (KR)

(72) Inventors: Jong Jin Lee, Yongin-si (KR); Gyu Ho Kim, Yongin-si (KR); Yong Joo Kim, Yongin-si (KR); Sang Hyun Na, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 18/958,929

(22) Filed: Nov. 25, 2024

(65) Prior Publication Data

US 2025/0363932 A1 Nov. 27, 2025

(30) Foreign Application Priority Data

May 22, 2024 (KR) ........................ 10-2024-0066227

(51) Int. Cl.

*G09G 3/20* (2006.01)
*G09G 3/00* (2006.01)
*G09G 3/32* (2016.01)

(52) U.S. Cl.

CPC ........... *G09G 3/2092* (2013.01); *G09G 3/006* (2013.01); *G09G 3/32* (2013.01); *G09G 2320/0233* (2013.01); *G09G 2330/12* (2013.01)

(58) Field of Classification Search

CPC ........ G09G 3/2092; G09G 3/006; G09G 3/32; G09G 2320/0233; G09G 2330/12; G09G 3/3275; G09G 2310/027; G09G 2320/0285; G09G 2320/0693; G09G 2320/08

See application file for complete search history.

(56) References Cited

U.S. PATENT DOCUMENTS

| | | | | |
|---|---|---|---|---|
| 10,546,527 | B2 | 1/2020 | Pyo et al. | |
| 10,810,943 | B2 * | 10/2020 | Yum | G09G 3/3258 |
| 11,462,164 | B1 * | 10/2022 | Orio | G09G 3/325 |
| 2015/0356947 | A1 * | 12/2015 | Eom | G09G 3/3225<br>345/211 |
| 2020/0111423 | A1 * | 4/2020 | Orio | G09G 3/3225 |
| 2021/0097958 | A1 * | 4/2021 | Fores Herranz | G09G 3/2003 |
| 2022/0114942 | A1 * | 4/2022 | Orio | G09G 3/2092 |
| 2023/0146875 | A1 * | 5/2023 | Kim | G09G 3/3233<br>257/40 |
| 2023/0215384 | A1 * | 7/2023 | Kim | G09G 3/3233<br>345/690 |
| 2023/0306916 | A1 * | 9/2023 | Chae | G09G 3/3233 |

(Continued)

FOREIGN PATENT DOCUMENTS

KR 102548652 B1 6/2023

*Primary Examiner* — Jose R Soto Lopez

(74) *Attorney, Agent, or Firm* — CANTOR COLBURN LLP

(57) ABSTRACT

A display device includes a display panel comprising a plurality of pixels, a scan driver configured to provide a scan signal to the display panel, a data driver configured to provide a data signal corresponding to each of the plurality of pixels to the display panel; a timing controller configured to control driving of the scan driver and the data driver, and a data converter configured to receive image data from the timing controller and generate the data signal from the image data based on a position of the pixel corresponding to the image data.

19 Claims, 14 Drawing Sheets

(56) References Cited

U.S. PATENT DOCUMENTS

| | | | | |
|---|---|---|---|---|
| 2024/0144854 | A1* | 5/2024 | Tark | G06F 3/0412 |
| 2024/0221600 | A1* | 7/2024 | Han | G09G 3/2096 |
| 2024/0428718 | A1* | 12/2024 | Wang | G09G 3/32 |

* cited by examiner

DISPLAY DEVICE AND ELECTRONIC DEVICE INCLUDING DISPLAY DEVICE

This application claims priority to Korean Patent Application No. 10-2024-0066227, filed on May 22, 2024, and all the benefits accruing therefrom under 35 U.S.C. § 119, the content of which in its entirety is herein incorporated by reference.

BACKGROUND

1. Field

Embodiments supported by the present disclosure relate to a display device and an electronic device including the display device.

2. Description of the Related Art

Recently, interest in information displays has been increasing. Accordingly, research and development on display devices is continuously being conducted. A display device includes a plurality of pixels connected to data lines and scan lines. A pixel includes a pixel circuit and a light-emitting element, and the light-emitting element emits light with certain luminance in response to a driving current supplied from a driving transistor through the pixel circuit.

Some areas of a substrate on which a display device is formed may be cut and removed. Accordingly, an interconnect of a power line may be disposed in a narrow area, and thus some pixels of a display device may generate light with relatively high luminance.

SUMMARY

An embodiment supported by aspects of the present disclosure provides a display device capable of reducing a problem in that the luminance of some areas at a lower end portion of a display panel is viewed as high.

A display device according to an embodiment supported by aspects of the present disclosure includes a display panel comprising a plurality of pixels, a scan driver configured to provide a scan signal to the display panel, a data driver configured to provide a data signal corresponding to each of the plurality of pixels to the display panel, a timing controller configured to control driving of the scan driver and the data driver, and a data converter configured to receive image data from the timing controller and generate the data signal from the image data based on a position of the pixel corresponding to the image data.

In an embodiment, the data converter may comprise a coefficient generator configured to output a correction coefficient based on the position of the pixel corresponding to the image data, and a data generator configured to optionally generate converted data by converting the image data based on the correction coefficient.

In an embodiment, the data generator may be configured to generate the converted data by applying the correction coefficient to the image data corresponding to the position of the pixel, and the coefficient generator may be configured to store a lookup table indicating the correction coefficient.

In an embodiment, the lookup table may comprise a respective correction coefficient for each of the pixels belonging to the display panel.

In an embodiment, the pixels belonging to the display panel may be divided into a plurality of groups, and the lookup table may comprise a respective correction coefficient for each of the plurality of groups.

In an embodiment, the coefficient generator may be configured to determine, with reference to the lookup table, the correction coefficient based on the position of the pixel in a first direction, and the lookup table may comprise correction coefficients corresponding to respective positions of the pixels in the first direction.

In an embodiment, the coefficient generator may be configured to determine, with reference to the lookup table, the correction coefficient based on the position of the pixel in a first direction and a position of the pixel in a second direction different from the first direction, and the lookup table may comprise correction coefficients corresponding to respective positions of the pixels in the first direction and respective positions of the pixels in the second direction.

In an embodiment, among the plurality of pixels, the coefficient generator may be configured to determine a correction coefficient of 1 for pixels positioned at a first portion of the display panel, and may be configured to determine respective correction coefficients for pixels positioned at a second portion of the display panel based on respective positions of the pixels in the second portion.

In an embodiment, the data generator may be configured to generate the converted data by multiplying the image data by the correction coefficient.

In an embodiment, the lookup table may be determined in an operation of inspecting the display panel.

In an embodiment, the data converter may further include a digital-to-analog converter configured to convert the converted data into the data signal.

In an embodiment, the display panel may comprise a left area, a central area, and a right area based on a first direction. For first pixels corresponding to the left area from among the plurality of pixels, the coefficient generator may be configured to generate correction coefficients which respectively decrease in a direction toward a right side of the left area, for second pixels corresponding to the central area from among the plurality of pixels, the coefficient generator may be configured to generate correction coefficients which respectively decrease in a direction toward an edge of the central area, and for third pixels corresponding to the right area from among the plurality of pixels, the coefficient generator may be configured to generate correction coefficients which respectively decrease in a direction toward a left side of the right area.

In an embodiment, for the plurality of pixels, the coefficient generator may be configured to generate correction coefficients which respectively decrease based on positions of the plurality of pixels in a direction.

In an embodiment, the data generator may be configured to generate the converted data by adding the image data and the correction coefficient.

A display device according to another embodiment supported by aspects of the present disclosure includes a display panel comprising a plurality of pixels, a scan driver configured to provide a scan signal to the display panel, a data driver configured to provide a data signal corresponding to each of the plurality of pixels to the display panel, and a timing controller configured to control driving of the scan driver and the data driver, and to generate the data signal from image data based on a position of the pixel corresponding to the image data. The timing controller may be configured to generate the data signal by converting the image data.

In an embodiment, the timing controller may comprise a coefficient generator configured to output a correction coefficient based on the position of the pixel corresponding to the image data, a data generator configured to optionally generate converted data by converting the image data based on the correction coefficient, and a digital-to-analog converter configured to convert the converted data into the data signal.

In an embodiment, the data generator may be configured to generate the converted data by applying the correction coefficient to the image data corresponding to the position of the pixel; and the coefficient generator may be configured to store a lookup table indicating the correction coefficient.

In an embodiment, the pixels belonging to the display panel may be divided into a plurality of groups, and the lookup table may comprise a respective correction coefficient for each of the plurality of groups.

In an embodiment, the data generator may be configured to generate the converted data by multiplying the image data by the correction coefficient.

In an embodiment, the display panel may comprise a left area, a central area, and a right area based on a first direction. For first pixels corresponding to the left area from among the plurality of pixels, the coefficient generator may be configured to generate correction coefficients which respectively decrease in a direction toward a right side of the left area, for second pixels corresponding to the central area from among the plurality of pixels, the coefficient generator may be configured to generate correction coefficients which respectively decrease in a direction toward an edge of the central area, and for third pixels corresponding to the right area from among the plurality of pixels, the coefficient generator may be configured to generate correction coefficients which respectively decrease in a direction toward a left side of the right area.

An electronic device includes a processor to provide input image data; and a display device to display an image based on the input image data. The display device includes a display panel including a plurality of pixels, a scan driver configured to provide a scan signal to the display panel, a data driver configured to provide a data signal corresponding to each of the plurality of pixels to the display panel, a timing controller configured to control driving of the scan driver and the data driver, and a data converter configured to receive image data from the timing controller and generate the data signal from the image data based on a position of the pixel corresponding to the image data.

DETAILED DESCRIPTION

Figure 1:
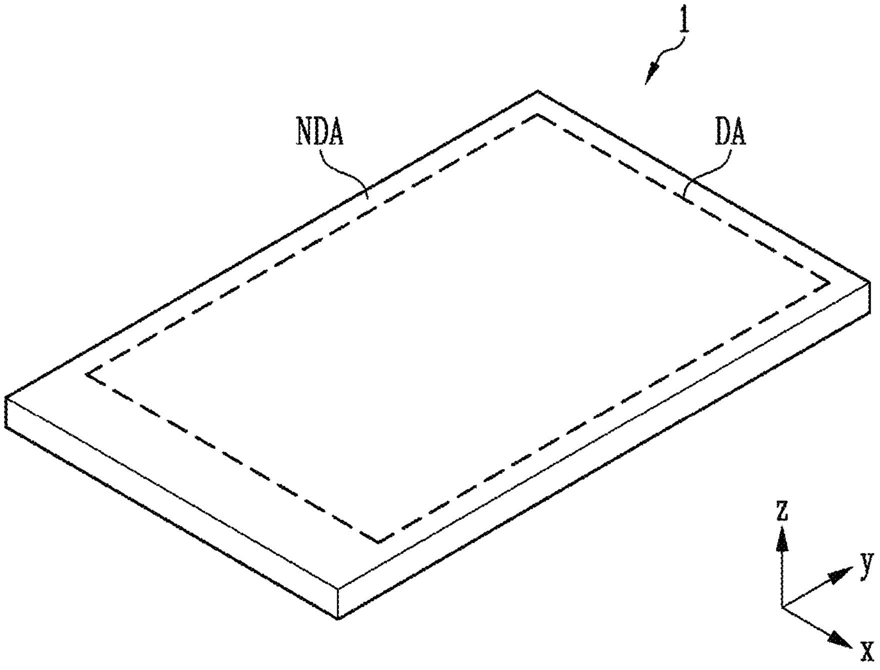
FIG. 1 is a schematic perspective view illustrating an electronic device according to an embodiment supported by aspects of the present disclosure.

It will be apparent to those skilled in the art that various modifications and variations can be made in the present disclosure without departing from the spirit or scope of the disclosure, and specific example embodiments are described in the drawings and explained in the detailed description. However, it should be understood that this is not intended to limit the embodiments of the present disclosure to a specific disclosed form, and includes all modifications, equivalents, and substitutes included in the technical scope of the embodiments of the present disclosure.

Since the descriptions provided herein can apply various transformations and have various embodiments, specific embodiments will be illustrated in the drawings and described in detail in the detailed description. However, it should be understood that this is not intended to limit the present disclosure to specific embodiments, and includes all transformations, equivalents, and substitutes included in the spirit and scope of the disclosure.

The terms, "first," "second," and the like may be simply used for description of various constituent elements, but those meanings may not be limited to the restricted meanings. The above terms are used for distinguishing one constituent element from other constituent elements. For example, a first constituent element may be referred to as a second constituent element and similarly, the second constituent element may be referred to as the first constituent element without departing from the scope of the embodiments of the present disclosure. An expression of a singular number includes an expression of the plural number, so long as it is clearly read differently.

In the present application, the word "comprise" or "has" is used to specify existence of a feature, a numbers, a process, an operation, a constituent element, a part, or a combination thereof, and it will be understood that existence or additional possibility of one or more other features or numbers, processes, operations, constituent elements, parts, or combinations thereof are not excluded in advance.

Some embodiments will be described with reference to the accompanying drawings in terms of functional blocks, units and/or modules. Those skilled in the art will understand that these blocks, units, and/or modules are physically implemented by logic circuits, discrete components, microprocessors, hard-wired circuits, memory elements, hard-wired connections, and other electronic circuits. The blocks, units, and/or modules may be formed using semiconductor-based manufacturing techniques or other manufacturing techniques.

Blocks, units, and/or modules implemented by microprocessors or other similar hardware may be programmed and controlled using software to perform various functions discussed herein and may be optionally driven by firmware and/or software. In some aspects, each block, unit, and/or module may be implemented by dedicated hardware or may be implemented by a combination of dedicated hardware that performs some functions and processors (for example, one or more programmed microprocessors and associated circuits) that perform other functions. In some aspects, in some embodiments, blocks, units, and/or modules may be physically separated into two or more individual blocks, units, and/or modules that interact with each other without departing from the scope of the concept of the embodiments described herein. In some aspects, in some embodiments, blocks, units and/or modules may be physically coupled as more complex blocks, units, and/or modules without departing from the scope of the concept of the embodiments described herein.

Hereinafter, a display device according to an embodiment supported by aspects of the present disclosure will be described with reference to the drawings related to the embodiments of the present disclosure.

FIG. 1 is a schematic perspective view illustrating an electronic device according to an embodiment supported by aspects of the present disclosure.

Referring to FIG. 1, an electronic device 1 may be a device that displays moving images or still images and may be used as a display screen of portable electronic devices such as, for example, a mobile phone, a smartphone, a tablet personal computer (PC), a mobile communication terminal, an electronic notebook, an electronic book, a portable multimedia player (PMP), a navigation system, and an ultra-mobile PC (UMPC) as well as various products such as, for example, a televisions, a laptop computer, a monitor, a billboard, and a device for the Internet of Things (IoT). In some aspects, the electronic device 1 according to an embodiment may be implemented as wearable devices such as, for example, a smartwatch, a watch phone, a glasses-type display, and a head mounted display (HMD) and may include a display device for each of the wearable devices. In some aspects, the electronic device 1 according to an embodiment may include a display device used as a dashboard of a vehicle, a center information display (CID) disposed on a center fascia or dashboard of a vehicle, a room mirror display that replaces a side mirror of a vehicle, an entertainment display for a back seat of a vehicle or a display placed on a rear surface of a front seat. The display device included in the above-described electronic device may be bendable, foldable, or rollable.

The electronic device 1 may have a rectangular shape in a plane view. Accordingly, the display device included in the electronic device 1 may also have a rectangular shape. For example, as illustrated in FIG. 1, the electronic device 1 may have a rectangular planar shape with a short side in an x-direction and a long side in a y-direction. A corner at which the short side in the x-direction meets the long side in the y-direction may be formed to be round to have a certain curvature or may be formed at a right angle. The planar shape of the electronic device 1 is not limited to a rectangular shape, but may be formed as another polygonal, oval, or irregular shape.

The display device included in the electronic device 1 may include a display area DA and a non-display area NDA. The non-display area NDA may be disposed to surround the display area DA.

Figure 2:
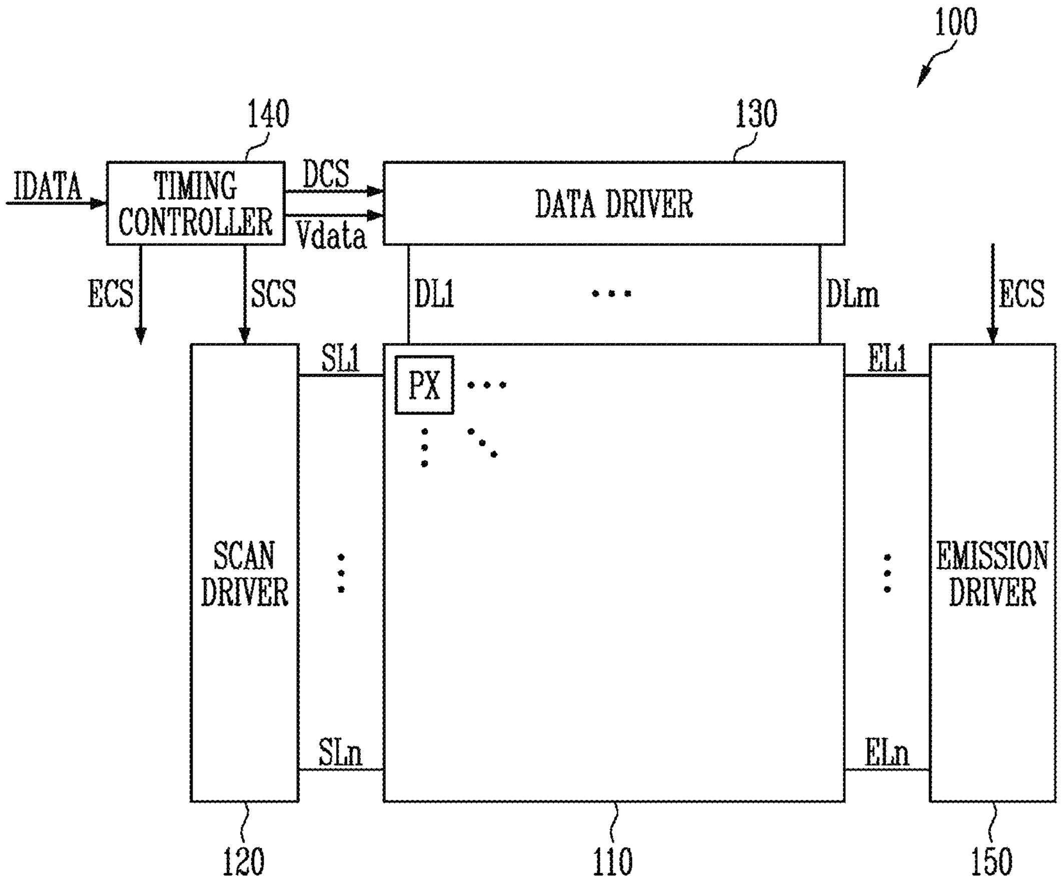
FIG. 2 is a block diagram illustrating a display device according to an embodiment supported by aspects of the present disclosure.

FIG. 2 is a block diagram illustrating a display device according to an embodiment supported by aspects of the present disclosure. Specifically, the display device 100 of FIG. 2 may be included in the electronic device 1 described with reference to FIG. 1.

Referring to FIG. 2, the display device 100 may include a display unit 110 (or a display panel), a scan driver 120, a data driver 130, a timing controller 140, and an emission driver 150.

The display unit 110 may include scan lines SL1 to SLn, wherein n is a positive integer, data lines DL1 to DLm, wherein m is a positive integer, an emission control lines EL1 to ELn, and pixels PX. The pixel PX may include a plurality of subpixels, and each of the subpixel may be connected to one of the scan lines SL1 to SLn, one of the data lines DL1 to DLm, and one of the emission control lines EL1 to ELn.

For example, the subpixel positioned in an $i^{th}$ row and a $j^{th}$ column may store or record a data signal (or a data voltage) provided through a $j^{th}$ data line DLj in response to a scan signal provided through an $i^{th}$ scan line SLi and may emit light with luminance corresponding to the stored data signal in response to an emission control signal provided through an $i^{th}$ emission control line ELi.

The scan driver 120 may generate a scan signal based on a scan control signal SCS and may sequentially provide the scan signal to the scan lines SL1 to SLn. Here, the scan control signal SCS may include a start signal, clock signals, and the like and may be provided from the timing controller 140. For example, the scan driver 120 may include a shift register that sequentially outputs scan signals, which correspond to a start signal in the form of a pulse, using clock signals.

The emission driver 150 may generate an emission control signal based on an emission control signal ECS and provide the emission control signal to the emission control lines EL1 to ELn sequentially or simultaneously. For example, the emission driver 150 may include a shift register that sequentially outputs emission control signals, which correspond to an emission start signal in the form of a pulse, using emission clock signals.

The timing controller 140 may receive input image data IDATA from the outside and generate the scan control signal SCS, the emission control signal ECS, and a data control signal DCS. In some aspects, the timing controller 140 may generate a data signal Vdata from the input image data IDATA.

For example, the timing controller 140 may convert input image data IDATA1 in a red-green-blue (RGB) format into image data in a format according to a pixel arrangement in the display unit 110 and may generates a data signal Vdata corresponding to the converted image data. In this case, the timing controller 140 may convert an input grayscale value included in the converted image data into the data signal Vdata using a gamma lookup table (GLUT).

The data driver 130 may generate data signals based on the data control signal DCS and the data signal Vdata and provide the data signals Vdata to the display unit 110. Here, the data control signal DCS is a signal for controlling the operation of the data driver 130 and may include a load signal (or a data enable signal) for instructing the output of a valid data signal.

For example, the data driver 130 may include a shift register, a latch, a decoder, an output buffer, and the like. The data driver 130 may sequentially provide the data signal Vdata to the shift register and the latch or temporarily store the data signal Vdata based on the data control signal DCS and may output a data signal corresponding to the data signal Vdata to the data line through the decoder.

Figure 3:
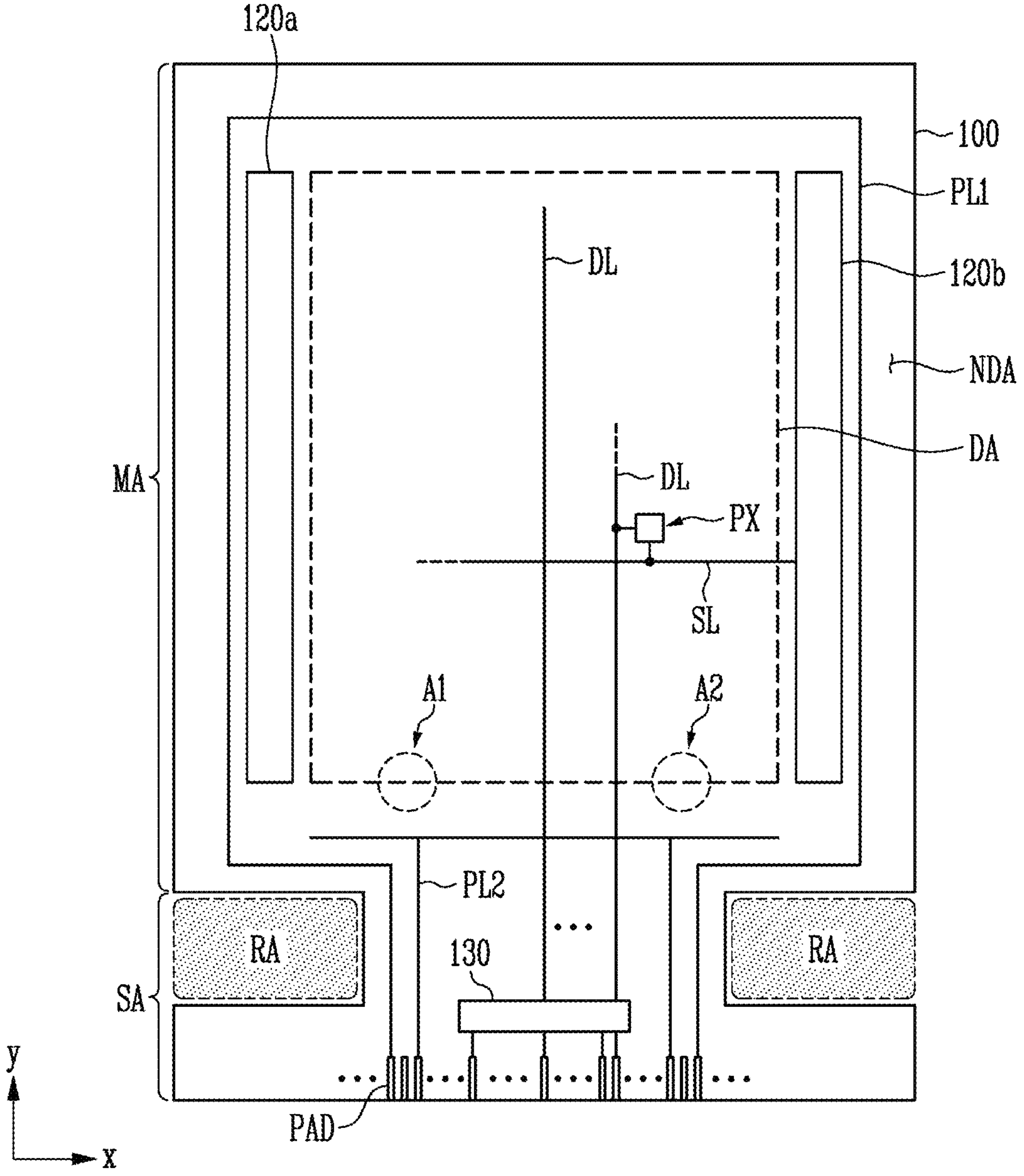
FIG. 3 is a schematic plan view illustrating a display device according to an embodiment supported by aspects of the present disclosure.

FIG. 3 is a schematic plan view illustrating a display device according to an embodiment supported by aspects of the present disclosure. Among the components illustrated in FIG. 2, the timing controller 140 and the emission driver 150 are omitted in FIG. 3.

Referring to FIG. 3, a display device 100 may include a display area DA and a non-display area NDA.

The display area DA may be a part that displays an image, and the display area DA may have various shapes such as, for example, a circular, oval, polygonal, or specific figure shape. Although FIG. 3 illustrates the display area DA having an approximately quadrangular shape, as another embodiment, the display area DA may have an approximately quadrangular shape with round corners.

The display device 100 may include light-emitting diodes as light-emitting elements disposed in the display area DA. The light-emitting diode may be included in a pixel PX, and the display device 100 may display an image using light emitted by each of a plurality of light-emitting diodes, for example, red light, green light, and blue light. The light-emitting diode may include an organic light-emitting diode including an organic emission layer.

In some embodiments, the light-emitting diode may be an inorganic light-emitting diode including an inorganic material. The inorganic light-emitting diode may include a PN junction diode including an inorganic semiconductor-based material. In an example in which a voltage is applied to the PN junction diode in a forward direction, holes and electrons are injected, and energy generated through the recombination of the holes and electrons is converted into light energy to emit light with a certain color. The above-described inorganic light-emitting diode may have a width of several to hundreds of micrometers or several to hundreds of nanometers. The emission layer of the light-emitting diode may include the above-described organic or inorganic material, but as another example, the emission layer of the light-emitting diode may include quantum dots. In other words, the light-emitting diode may be a quantum dot light-emitting diode.

The light-emitting diode LED may be turned on/off by being electrically connected to a pixel circuit including transistors in each pixel PX. In this regard, FIG. 3 illustrates a scan line SL and a data line DL as signal lines electrically connected to the pixel PX. In some embodiments, although not illustrated in FIG. 3, as described herein with reference to FIG. 2, the pixel PX may be connected to an emission control line.

The non-display area NDA may be disposed outside the display area DA. The non-display area NDA may entirely surround the display area DA. A portion of the non-display area NDA (hereinafter referred to as a protruding peripheral area) may extend in a direction away from the display area DA. In other words, the display device 100 may include a main area MA including the display area DA and a portion of the non-display area NDA surrounding the display area DA, and a sub-area SA extending in one direction from the main area MA.

A width (width in an x-direction) of the sub-area SA may be shorter than a width (width in the x-direction) of the main area MA. In some embodiments, in order to secure a spare area RA at an outer peripheral portion of the display device 100, a portion of the sub-area SA in the non-display area NDA may be recessed in the x-direction or a −x-direction as illustrated in FIG. 3. Before or while the display device 100 is formed on a substrate, a portion of the substrate corresponding to the spare area RA is cut to form the sub-area SA having a recessed portion as illustrated in FIG. 3.

As applicable, embodiments of the present disclosure support determining the shape and size of the spare area RA in various ways. As the size of the spare area RA becomes larger, other components of the electronic device 1 may be disposed a corresponding space, and thus the electronic device 1 may be miniaturized.

In some embodiments, since a portion of the sub-area SA may be recessed in the x-direction or −x direction as illustrated in FIG. 3 in association with providing the spare area RA of the electronic device 1, as an area of the spare area RA increases, a size of a portion recessed in the sub-area SA of the display device 100, that is, a size of a portion cut into a rectangular shape and removed, may also increase.

Both the main area MA and the sub-area SA of the display device 100 may be formed on a substrate. In an embodiment, a portion of the sub-area SA may be bent. To this end, at least a portion of the substrate on which the display device 100 is formed may be formed of a flexible material.

In the non-display area NDA, a first driving circuit 120*a* and a second driving circuit 120*b* which provide a scan signal to each pixel PX, and a data driver 130 which provides a data signal to each pixel PX, a first power line PL1 for providing a first power voltage, and a second power line PL2 for providing a second power voltage may be disposed. The first driving circuit 120*a* and the second driving circuit 120*b* may be included in the scan driver 120 of FIG. 2.

In an embodiment, the first driving circuit 120*a* and the second driving circuit 120*b* may be positioned at opposite sides with the display area DA interposed between the first driving circuit 120*a* and the second driving circuit 120*b*. The scan line SL disposed relatively at a left side in the display area DA may be electrically connected to the first driving circuit 120*a*, and the scan line SL disposed relatively at a right side may be electrically connected to the second driving circuit 120*b*.

The data driver 130 may transmit a data signal to the pixel PX through the data line DL passing through the display area DA. In an embodiment, the first power line PL1 may partially surround a periphery of the display area DA, and the second power line PL2 may be disposed at one side of the display area DA.

The display device 100 may include pads PAD. The pads PAD may be positioned at a lower end portion of the non-display area NDA and may each be connected to the data line DL and the first power line PL1, or the second power line PL2.

FIG. 3 illustrates that the data driver 130 is disposed on a substrate on which a display unit (or display panel) is formed. However, according to another embodiment, the data driver 130 may be disposed on another substrate connected through the pad.

Referring to FIG. 3, in order to provide the spare area RA of the electronic device 1, a portion of the sub-area SA is recessed in the x direction or the −x direction as illustrated in FIG. 3, and the first power line PL1 and the second power line PL2 are disposed relatively adjacent to the spare area RA of the sub-area SA. In some aspects, the first power line PL1 and the second power line PL2 are densely disposed in a narrow area together with other signal lines or power lines such as, for example, the data line DL. Accordingly, among the pixels included in the display unit of the display device 100, the pixels in areas A1 and A2 adjacent to the spare area RA generate light with relatively higher luminance than other surrounding pixels. That is, in an image displayed by the display panel of the display device 100, a problem occurs that the areas A1 and A2 at a lower end bottom of the display panel are viewed brightly.

Figure 4:
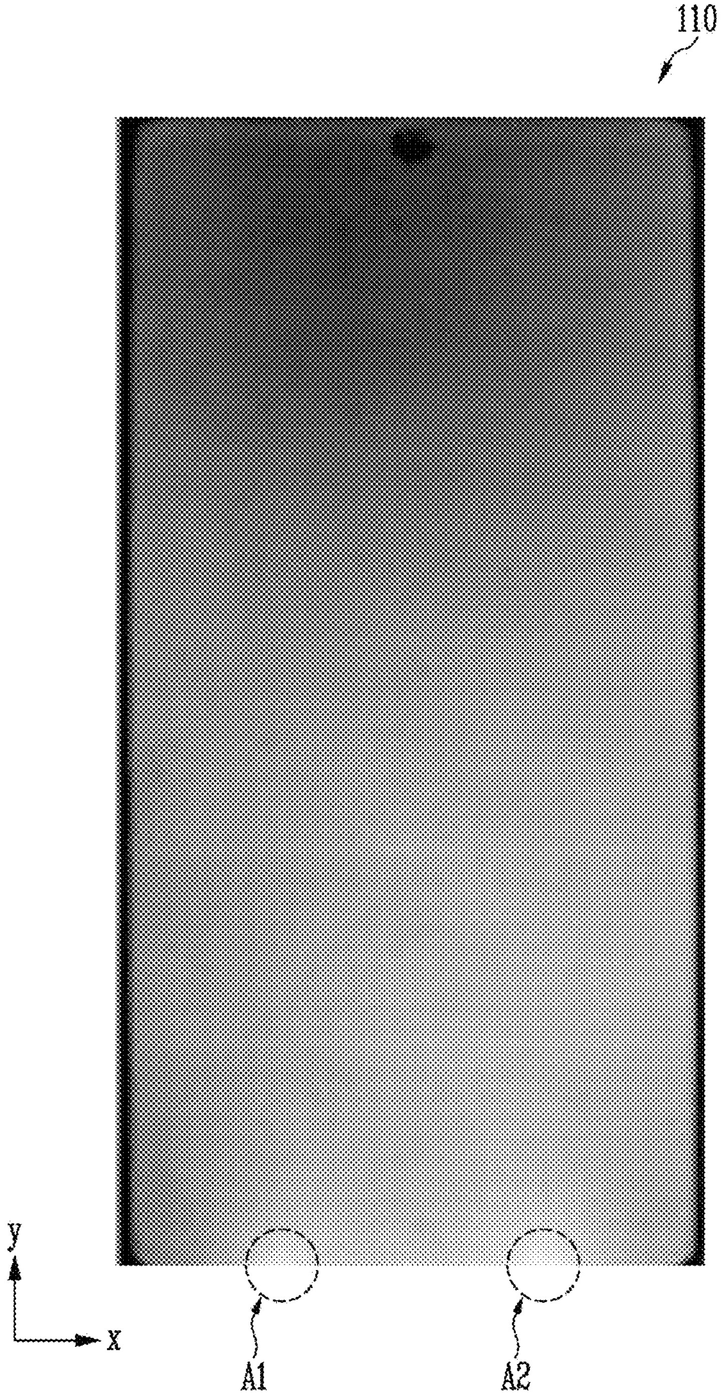
FIG. 4 is a view for describing a problem in that a lower end portion of a display unit of the display device illustrated in FIG. 3 is viewed brightly.
Figure 5:
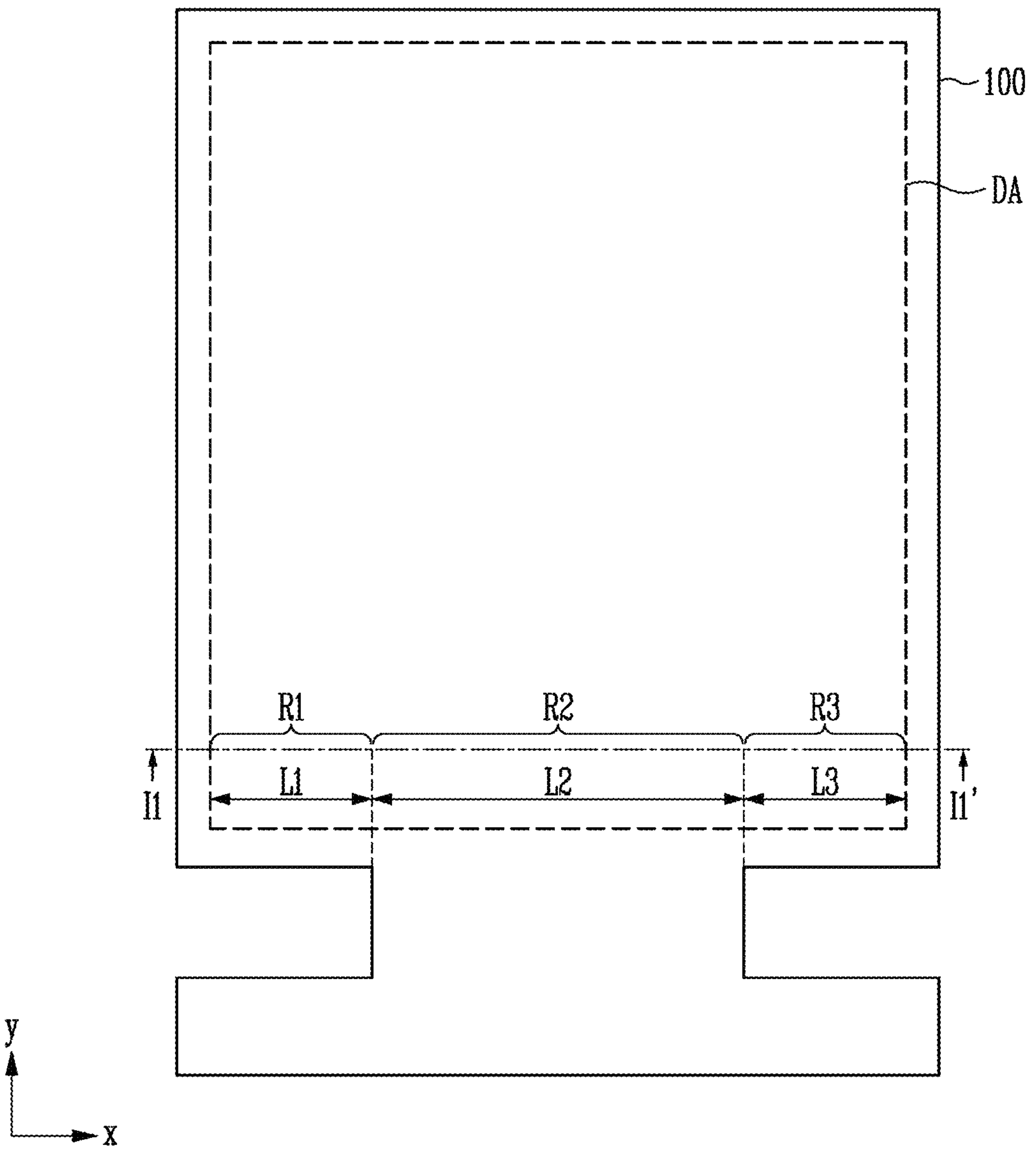
FIG. 5 is a view for describing positions of areas viewed brightly at a lower end portion of a display unit.
Figure 6:
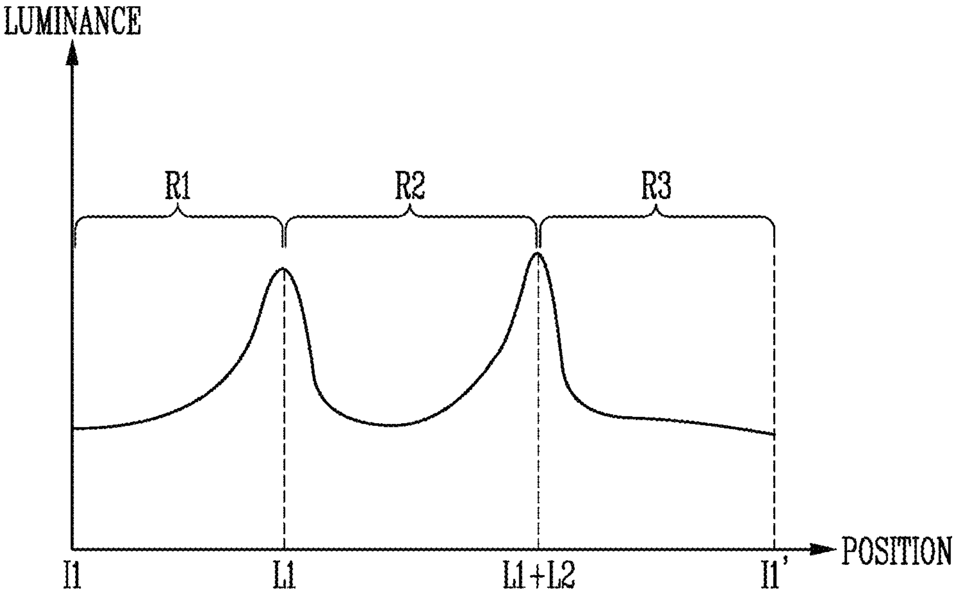
FIG. 6 is a graph illustrating the relative luminance of pixels positioned in line I1-I1' of FIG. 5.

FIG. 4 is a view for describing a problem in that a lower end portion of the display unit of the display device illustrated in FIG. 3 is viewed brightly. FIG. 5 is a view for describing positions of areas viewed brightly at the lower end portion of the display unit. FIG. 6 is a graph illustrating the relative luminance of pixels positioned in line I1-I1' of FIG. 5. Hereinafter, a problem in that the areas A1 and A2 of the display unit are viewed brightly will be described with reference to FIGS. 4 to 6.

Referring to FIG. 4, when all pixels included in the display device output light corresponding to the same pieces of data, the areas A1 and A2 at the lower end portion of the display unit are viewed as brighter than other areas. As described herein, a portion of the sub-area SA corresponding to the spare area RA may be cut. Referring to FIG. 5, a left area R1, a central area R2, and a right area R3 may be defined in the display unit of the display device, that is, a portion corresponding to the display area DA. The left area R1, the central area R2, and the right area (R3 may be determined according to the size of the cut and removed portion of the spare area RA. For example, the left area R1 may correspond to a portion that is cut and removed from a left side of the spare area RA. The central area R2 may correspond to an uncut portion of the spare area RA. The right area R3 may correspond to a portion that is cut and removed from a right side of the spare area RA. The left area R1, the central area R2, and the right area R3 may have lengths L1, L2, and L3 in the x-direction, respectively.

Referring to FIG. 6, the relative luminance of the pixels positioned along line I1-I1' at a lower end portion of the display area DA among the pixels in the display area DA in FIG. 5 is illustrated. Referring to FIG. 4, the luminance of each of the areas A1 and A2 of the display unit is illustrated as being the highest, and accordingly, in the graph of FIG. 6, the luminance of each of a position corresponding to the length L1 and a position corresponding to a length L1+L2 is illustrated as being the highest.

According to a display device according to another embodiment supported by aspects of the present disclosure, a value of corresponding data is converted according to a position of the pixel to compensate for a difference in luminance at the lower end portion of the display unit, for example, compared to another portion (e.g., an upper end portion, a middle portion) of the display unit. Accordingly, the quality of an image displayed on the display unit of the display device may be improved.

Figure 7:
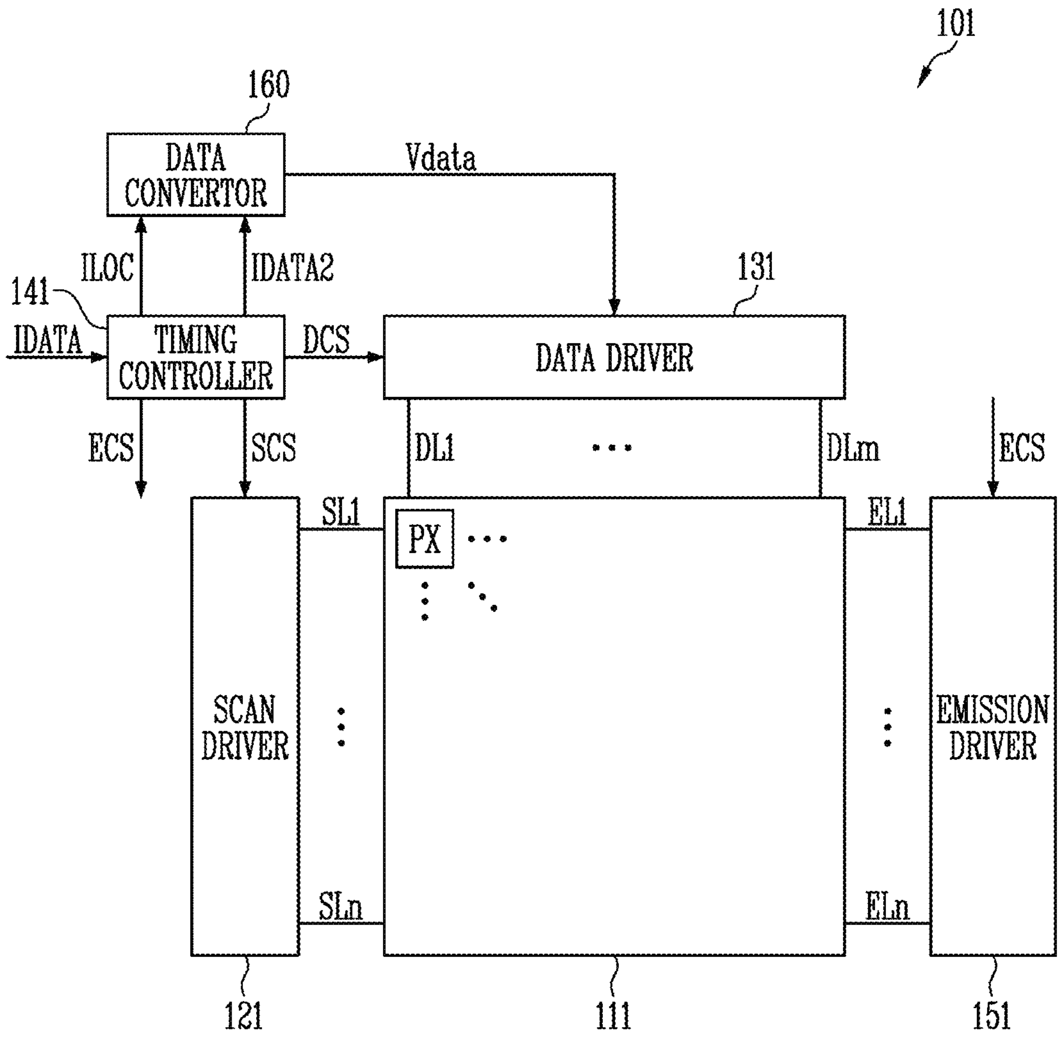
FIG. 7 is a block diagram illustrating a display device according to another embodiment supported by aspects of the present disclosure.

FIG. 7 is a block diagram illustrating a display device according to another embodiment supported by aspects of the present disclosure.

Referring to FIG. 7, a display device 101 may include a display unit 111 (or a display panel), a scan driver 121, a data driver 131, a timing controller 141, and a emission driver 151. In some embodiments, the display device 101 of FIG. 7 may further include a data converter 160. The display unit 111 (or the display panel), the scan driver 121, the data driver 131, and the emission driver 151 of FIG. 7 are may operate in substantially the same manner as the display unit 110 (or the display panel), the scan driver 120, the data driver 130, and the emission driver 150 of FIG. 7, respectively. Therefore, redundant descriptions of these components will be omitted.

The timing controller 141 included in the display device 101 of FIG. 7 may convert input image data IDATA1 in an RGB format in association with generating the second image data IDATA2 in a format according to a pixel arrangement in the display unit 111 and transmit the generated second image data IDATA2 to the data converter 160. For example, the timing controller 141 may generate the second image data IDATA2 based on converting the input image data IDATA1. In some embodiments, the timing controller 141 may transmit position data ILOC including information about a position of the second image data IDATA2 to the data converter 160. In an embodiment, the position data ILOC may be data indicating a position of the display unit 111 at which the second image data IDATA2 is displayed.

The data converter 160 converts the second image data IDATA2 based on the received position data ILOC. In some embodiments, the data converter 160 may convert an input grayscale value included in converted image data into a data signal Vdata using a GLUT and may transmit the data signal Vdata to the data driver 131.

In the embodiment of FIG. 7, the data converter 160 is illustrated as being provided separately from the timing controller 141. However, embodiments of the present disclosure are not limited thereto, and the data converter 160 may be provided such that the data converter 160 is integrated into the timing controller 141. As another example, the data converter 160 may be present outside the display device 101, and in this case, image data converted from the data converter 160 may be input to the timing controller 141 of the display device.

Figure 8:
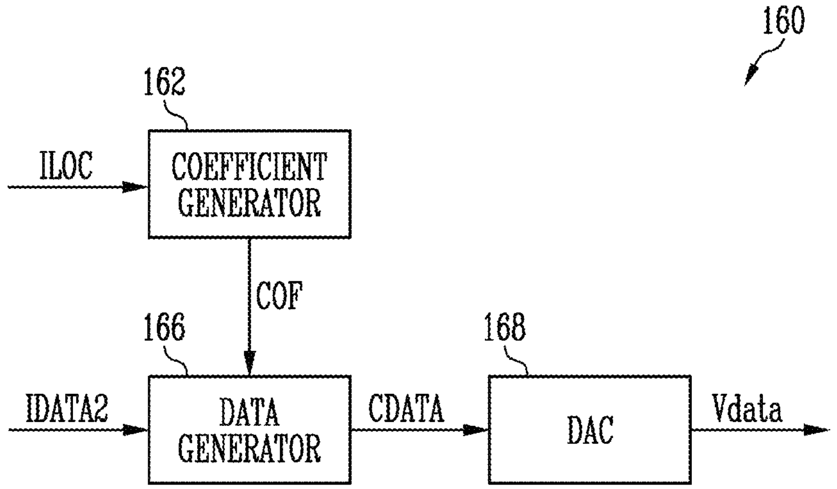
FIG. 8 is a block diagram illustrating an example embodiment of a data converter of FIG. 7.
Figure 9:
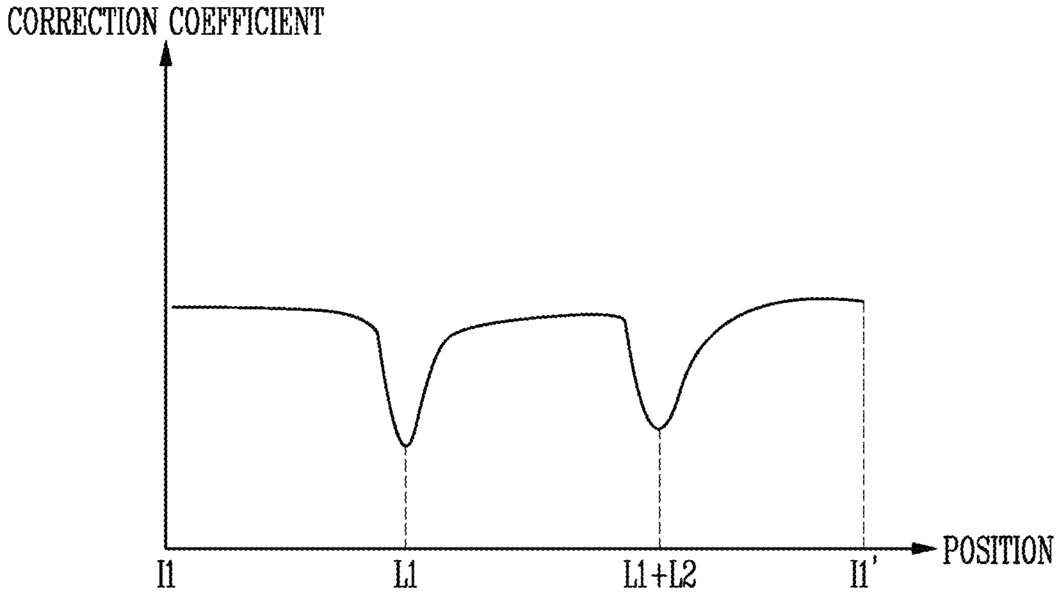
FIG. 9 is a graph illustrating a size of a correction coefficient according to a position of a pixel.

FIG. 8 is a block diagram illustrating an example embodiment of the data converter of FIG. 7. FIG. 9 is a graph illustrating a size of a correction coefficient according to a position of a pixel.

Referring to FIG. 8, the data converter 160 may include a coefficient generator 162, a data generator 166, and a digital-to-analog converter 168.

The coefficient generator 162 receives the position data ILOC from the timing controller 141. As described herein, the position data ILOC may be data indicating a position of a pixel corresponding to the second image data IDATA2 in the display unit 111. The coefficient generator 162 may generate a correction coefficient COF corresponding to the second image data IDATA2 based on the position data ILOC and may transmit the generated correction coefficient COF to the data generator 166.

Referring to FIG. 9, the correction coefficients COF respectively corresponding to the pixels positioned along line I1-I1' at the lower end portion of the display area DA among the pixels of the display area DA in FIG. 5 are illustrated. Referring to FIGS. 4 and 6, since the luminance of each of a position corresponding to the length L1 and a position corresponding to the length L1+L2 is the highest, embodiments of the present disclosure may include applying a relatively smallest correction coefficient COF for each of the positions, as illustrated in FIG. 9. In some embodiments, referring to FIGS. 4 and 6, since luminance decreases in a direction away from the position corresponding to the length L1 or a direction away from the position corresponding to the length L1+L2, as illustrated in FIG. 9, embodiments of the present disclosure may include applying correction coefficients COF which respectively increase in the direction away from the position corresponding to the length L1 or the direction away from the position corresponding to the length L1+L2.

In other words, for pixels corresponding to the left area R1 of FIG. 5, embodiments of the present disclosure may include applying a correction coefficient having a relatively small value to image data as a pixel position is shifted to a right side of the left area R1. In some aspects, for pixels corresponding to the central area R2 in FIG. 5, embodiments of the present disclosure may include applying a correction coefficient having a relatively small value to image data as a pixel position is shifted to an edge (e.g., a left edge of the central area R2, a right edge of the central area R2). In some embodiments, for pixels corresponding to the right area R3 in FIG. 5, embodiments of the present disclosure may include applying a correction coefficient having a relatively small value to image data as a pixel position is shifted to a left side of the right area R3.

Accordingly, for example, embodiments of the present disclosure may include applying correction coefficients of relatively small values for pixels located at edges between the left area R1 and the central area R2, and in some aspects, for pixels located at edges between the right area R3 and the central area R2. In an example, for first pixels corresponding to the left area R1, the coefficient generator 162 is configured to generate correction coefficients which respectively decrease in a direction (e.g., x-direction) toward a right side of the left area R1. For second pixels corresponding to the central area R2, the coefficient generator 162 is configured to generate correction coefficients which respectively decrease in a direction (e.g., x-direction, negative x-direction) toward an edge of the central area R2. For third pixels corresponding to the right area R3 from among the plurality of pixels, the coefficient generator 162 is configured to generate correction coefficients which respectively decrease in a direction (e.g., negative x-direction) toward a left side of the right area R3.

The coefficient generator 162 may store correction coefficients corresponding to positions of the pixels in the x-direction illustrated in FIG. 5, for example, correction coefficients such as, for example, those illustrated in FIG. 9 in the form of a lookup table. The coefficient generator 162 may determine the correction coefficient COF corresponding to the received position data ILOC with reference to the lookup table and may transfer the determined correction coefficient COF to the data generator 166. Correction coefficients may be determined during an operation of inspecting the display device 101. For example, during an inspection process, the display device 101 may display a reference image, and thus a luminance difference as illustrated in FIG. 4 may be photographed. Afterwards, embodiments of the present disclosure include analyzing the luminance difference based on captured image data, and further, calculating correction coefficients that may compensate for the luminance difference. The calculated correction coefficients may be included in the lookup table and stored in the coefficient generator 162.

Referring again to FIG. 8, the data generator 166 generates converted data CDATA from the second image data IDATA2 based on the correction coefficient COF received from the coefficient generator 162. In an embodiment, the data generator 166 may multiply the second image data IDATA2 by the received correction coefficient COF and may generate a result of the multiplying as the converted data CDATA. In another example, the data generator 166 may add the received correction coefficient COF to the second image data IDATA2 and generate a result of the addition as the converted data CDATA. In some aspects, in various other ways, the data generator 166 may generate the converted data CDATA by reflecting the received correction coefficient COF in the second image data IDATA2. Hereinafter, for convenience of discussion, an embodiment will be mainly described in which the data generator 166 multiplies the second image data IDATA2 by the received correction coefficient COF and generates a result of the multiplying as the converted data CDATA.

The generated converted data CDATA may be transmitted to the digital-to-analog converter 168. The digital-to-analog converter 168 generates a data signal Vdata from the converted data CDATA in a digital form. The generated data signal Vdata will be transmitted to the data driver 131 as illustrated in FIG. 7.

As illustrated in FIG. 4, a difference in luminance between areas A1 and A2 and other areas may be noticeably viewable at the lower end portion of the display area DA. Accordingly, in an embodiment, the display device 101 may apply the generated correction coefficient to data corresponding to pixels positioned relatively at the lower end portion of the display area DA of FIG. 5 (e.g., only to data corresponding to pixels positioned relatively at the lower end portion of the display area DA of FIG. 5). In other words, the display device 101 may apply the correction coefficient as illustrated in FIG. 9 to data corresponding to pixels positioned relatively at the lower end portion of the display area DA of FIG. 5 (e.g., only to data corresponding to pixels positioned relatively at the lower end portion of the display area DA of FIG. 5), and may apply a correction coefficient of 1 to data corresponding to pixels positioned relatively at an upper end portion. In this case, for example, based on the applied correction coefficient of 1, the data corresponding to the pixels positioned relatively at the upper end portion may not be converted.

Embodiments of the present disclosure support determining, in various ways, a standard for dividing the upper end portion and the lower end portion of the display area DA. For example, the standard may be determined such that a ratio between the number of pixels belonging to the upper end portion of the display area and the number of pixels belonging to the lower end portion of the display area is 5:5. As another example, the standard may be determined such that a ratio between the number of pixels belonging to the upper end portion of the display area and the number of pixels belonging to the lower end portion of the display area is 2:8. As still another example, the standard may be determined such that a ratio between the number of pixels belonging to the upper end portion of the display area and the number of pixels belonging to the lower end portion of the display area is 1:9. However, embodiments of the present disclosure are not limited thereto.

As described herein, according to the display device according to another embodiment supported by aspects of the present disclosure, the display device may convert a value of corresponding data according to a position of a pixel to compensate for a difference in luminance at the lower end portion of the display unit. Accordingly, the quality of an image displayed on the display unit of the display device may be improved.

Figure 10:
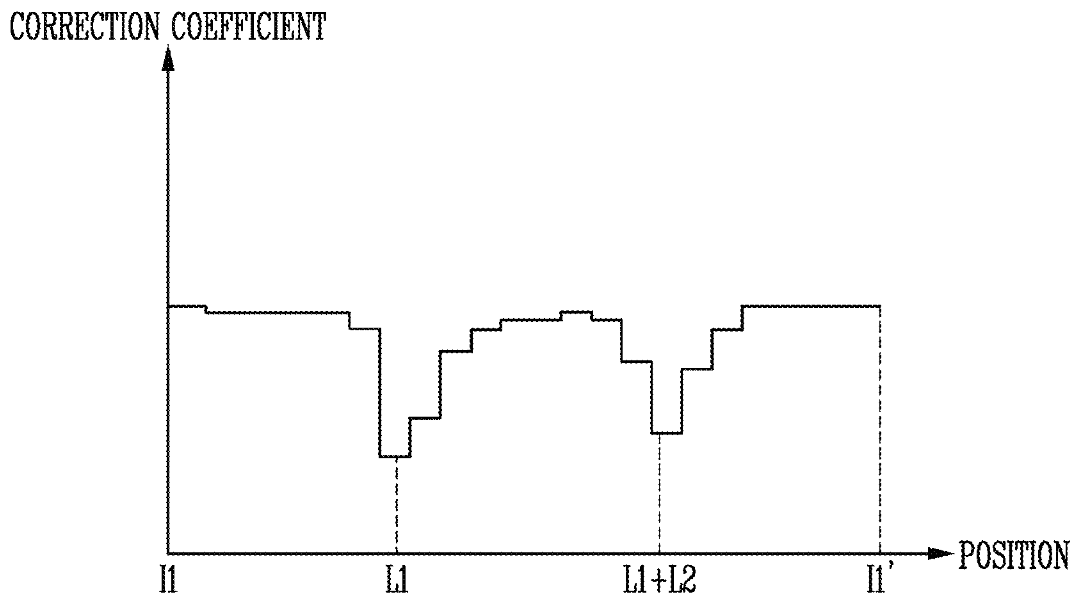
FIG. 10 is a graph for describing an embodiment in which one correction coefficient is applied to a group of pixels.

FIG. 10 is a graph for describing an embodiment in which a correction coefficient (COF) (e.g., one correction coefficient) is applied to a group of pixels. Referring to FIG. 9, it can be seen that different respective correction coefficients COF are applied to pieces of data corresponding to pixels. For example, with reference to FIG. 9, embodiments of the present disclosure may include applying different respective correction coefficients COF to pieces of data corresponding to pixels.

In the example case described with reference to FIG. 9, applying different respective correction coefficients COF may include allocating a relatively larger number of spaces in association with storing the correction coefficients in the form of a lookup table. For example, many spaces may be implemented to store the correction coefficients COF in the form of a lookup table. For example, the lookup table may include a respective correction coefficient COF for each of the pixels belonging to a given display panel.

Therefore, as illustrated in FIG. 5, a plurality of pixels included in the display area DA of the display device 100 are defined as blocks (also referred to herein as groups) in the x-direction, and a correction coefficient may be applied to image data corresponding to pixels belonging to a given block (e.g., pixels belonging to the same block). In this case, as illustrated in FIG. 10, embodiments of the present disclosure may include applying the same correction coefficient to image data corresponding to a plurality of pixels adjacent in the x-direction. Since one correction coefficient is applied to a block including a plurality of pixels, the capacity of a lookup table stored by the coefficient generator 162 may be reduced.

Figure 11:
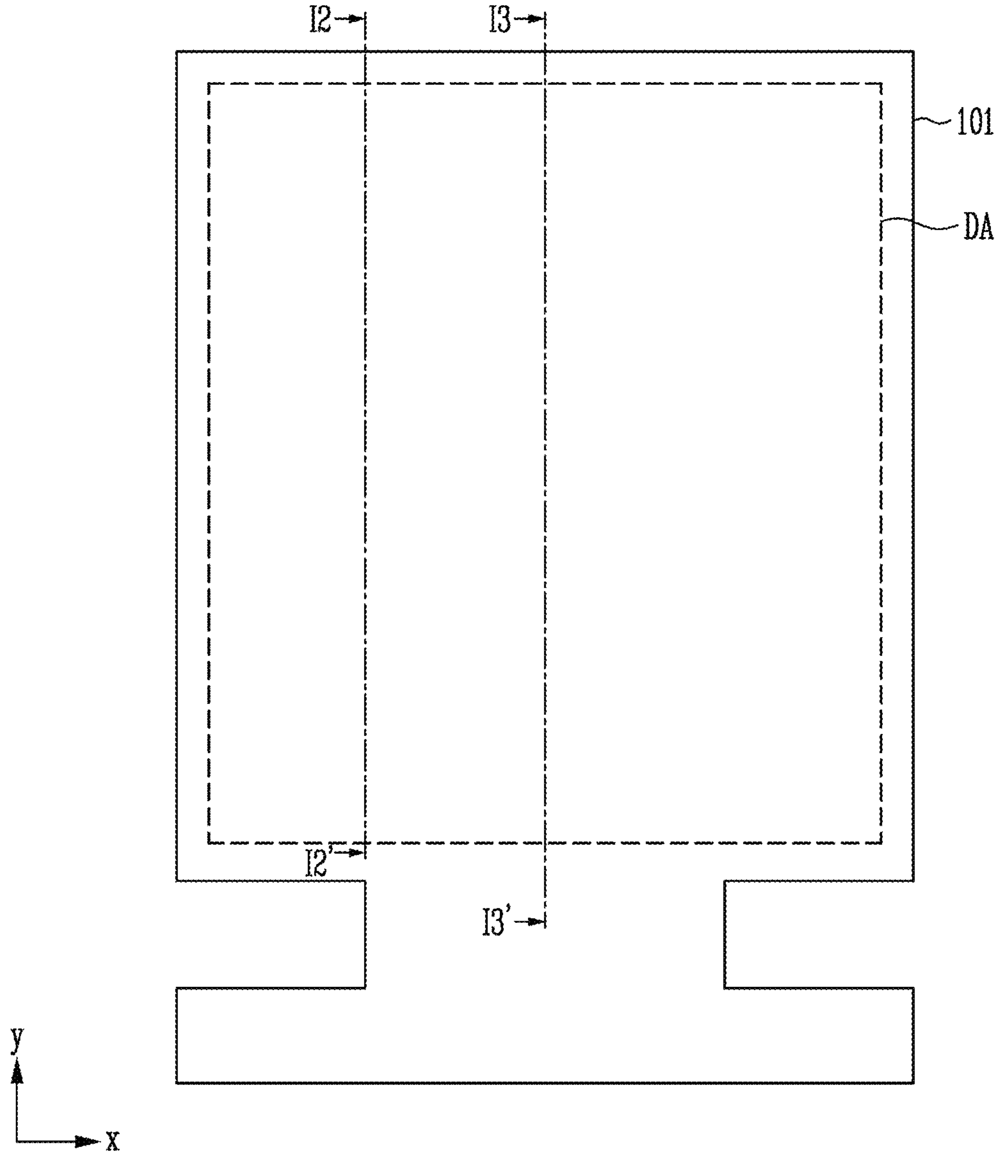
FIG. 11 is a view for describing a difference in brightness between an upper end portion and a lower end portion of a display unit.
Figure 12:
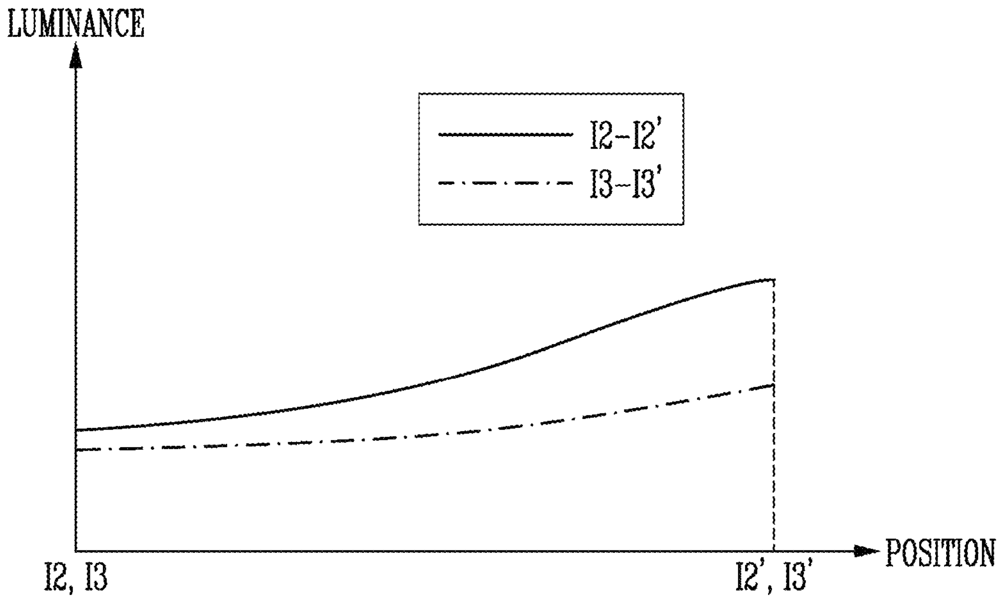
FIG. 12 is a graph illustrating the relative luminance of each of pixels positioned along lines I2-I2' and I3-I3' of FIG. 11.

FIG. 11 is a view for describing a difference in brightness between the upper end portion and the lower end portion of a display unit. FIG. 12 is a graph illustrating the relative luminance of each of pixels positioned along lines I2-I2' and I3-I3' of FIG. 11. Hereinafter, with reference to FIGS. 11 and 12, luminance changes of the upper and lower end portions in a position of the display unit the x-direction will be described.

In FIG. 11, a position of line I2-I2' in the x-direction direction may be a position of L1 illustrated in FIG. 5. In some embodiments, a position of line I3-I3' in the x-direction may be a center of the display unit included in the display device 101, that is, the center of the display area DA.

Referring to FIG. 12, the luminance of each of pixels positioned along line I2-I2' is illustrated as a solid line, and the luminance of each of pixels positioned along line I3-I3' is illustrated as a dotted line. The luminance of each of the pixels positioned along the I2-I2' line is higher than the luminance of each of the pixels positioned along line I3-I3'. In some aspects, a luminance change of the pixels positioned along line I2-I2' is greater than a luminance change of the pixels positioned along line I3-I3'. In order to compensate for a luminance change in a y-direction, embodiments of the present disclosure may include applying a correction coefficient according to a position of a pixel in the y-direction as well as a position of the pixel in the x-direction. In an example, in a state in which the position of the pixel in the x-direction is fixed, embodiments of the present disclosure may include applying a relatively small correction coefficient to image data as the position in the y-direction increases.

In an embodiment, the coefficient generator 162 of FIG. 8 may store a respective correction coefficient COF for each of all pixels positioned in the display area DA in the form of a lookup table. According to the above embodiment, when the number of pixels is m×n, the number of correction coefficients may also be m×n. In this case, many spaces may be implemented to store the correction coefficients COF in the form of a lookup table.

Accordingly, a plurality of pixels may be defined as blocks in the x-direction and the y-direction, and embodiments of the present disclosure may include applying a correction coefficient (e.g., one correction coefficient) to image data corresponding to pixels belonging to one block (or area). Hereinafter, descriptions will be described with reference to FIG. 13.

Figure 13:
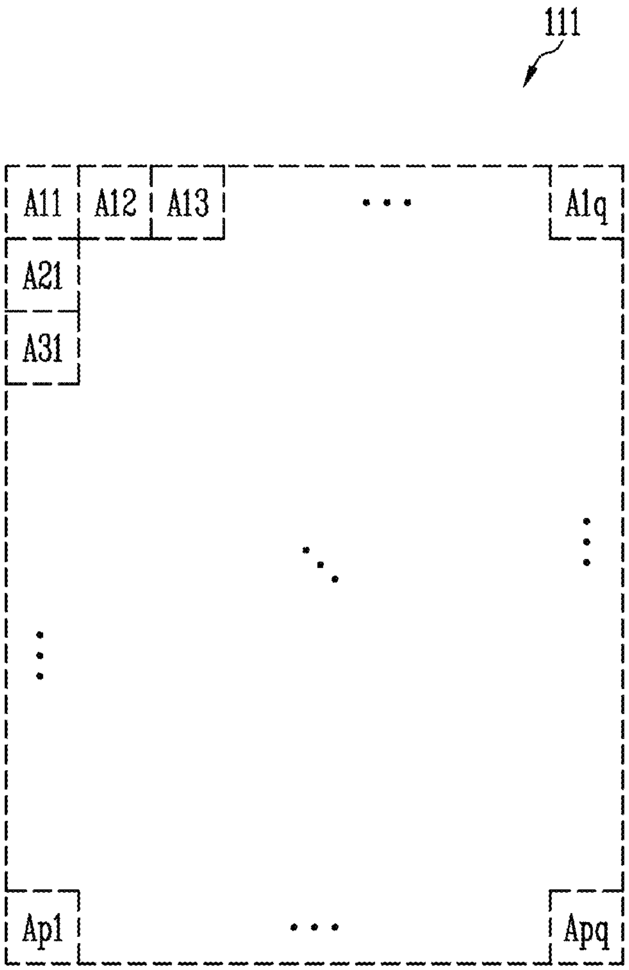
FIG. 13 is a view for describing an embodiment in which a correction coefficient is applied by dividing a display unit into a plurality of areas.

FIG. 13 is a view for describing an embodiment in which a correction coefficient is applied by dividing a display unit into a plurality of areas. Referring to FIG. 13, the display unit 111 is divided into p×q areas. Specifically, a first row includes areas A11 to A1*q*, a second row includes areas A21 to A2*q* and a last $p^{th}$ row includes areas Ap1 to Apq.

Each of areas may include a plurality of pixels. The plurality of pixels corresponding to each area may be defined as one block. Accordingly, p×q that is the number of blocks may be smaller than m×n that is the number of pixels. In the display device according to an embodiment supported by aspects of the present disclosure, the display device may apply one correction coefficient to image data corresponding to pixels belonging to one block. Accordingly, the number of correction coefficients also becomes p×q. Since one correction coefficient is applied to a block including a plurality of pixels, the capacity of the lookup table stored in the coefficient generator 162 may be reduced.

Figure 14:
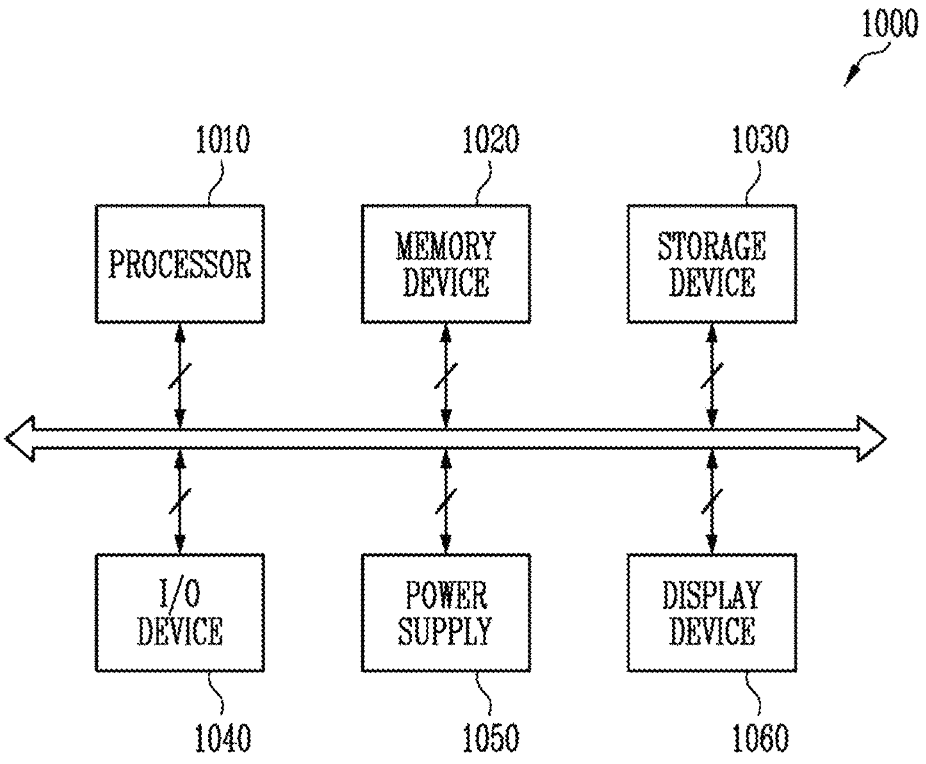
FIG. 14 is a schematic block diagram illustrating an electronic device including a display device in accordance with an embodiment.
Figure 15:
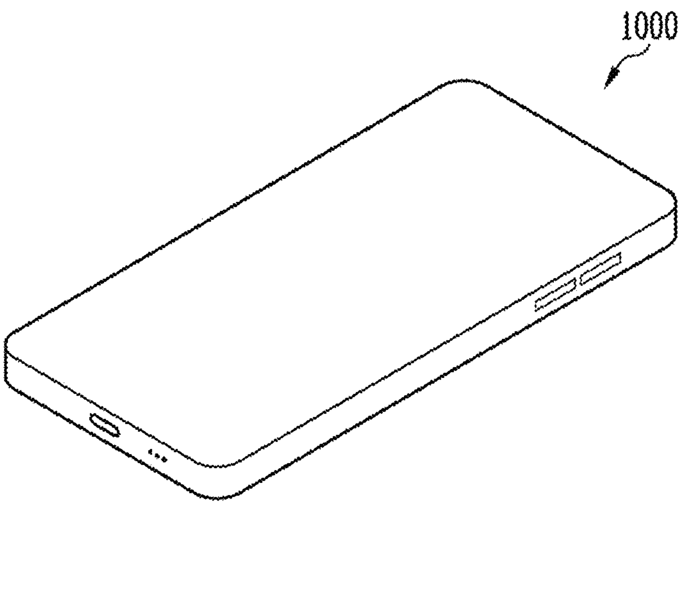
FIG. 15 is a schematic diagram illustrating an example where the electronic device of FIG. 14 is a smartphone.
Figure 16:
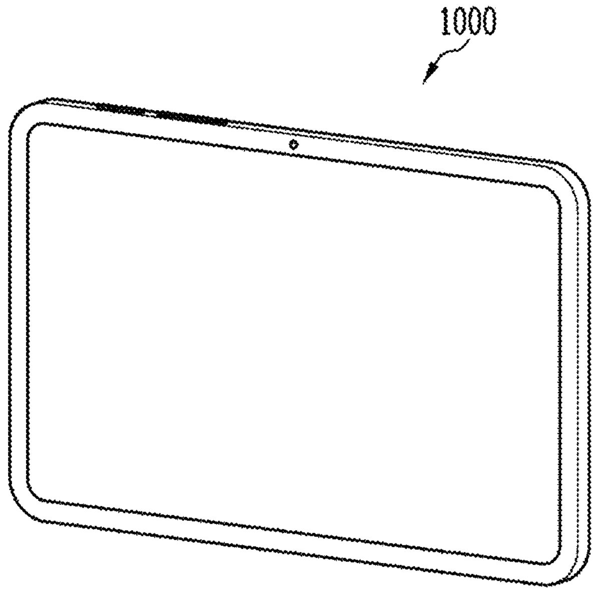
FIG. 16 is a schematic diagram illustrating an example where the electronic device of FIG. 14 is a tablet computer.

FIG. 14 is a schematic block diagram illustrating an electronic device 1000 including a display device in accordance with an embodiment. FIG. 15 is a schematic diagram illustrating an example where the electronic device 1000 of FIG. 14 is a smartphone. FIG. 16 is a schematic diagram illustrating an example where the electronic device 1000 of FIG. 14 is a tablet computer.

Referring to FIGS. 14 to 16, the electronic device 1000 may include a processor 1010, a memory device 1020, a storage device 1030, an input/output (I/O) device 1040, a power supply 1050, and a display device 1060. The display device 1060 may be the display device 100 of FIG. 2. The electronic device 1000 may further include various ports for communication with a video card, a sound card, a memory card, a USB device, or other systems. In an embodiment, as illustrated in FIG. 15, the electronic device 1000 may be a smartphone. In an embodiment, as illustrated in FIG. 16, the electronic device 1000 may be a tablet computer. However, the aforementioned examples are illustrative, and the electronic device 1000 is not necessarily limited to the aforementioned examples. For example, the electronic device 1000 may be a cellular phone, a video phone, a smart pad, a smartwatch, a navigation device for vehicles, a computer monitor, a laptop computer, a head-mounted display device, or the like.

The processor 1010 may perform specific calculations or tasks. In an embodiment, the processor 1010 may be a microprocessor, a central processing unit, an application processor, or the like. The processor 1010 may be connected to other components through an address bus, a control bus, a data bus, and the like. In an embodiment, the processor 1010 may be connected to an expansion bus such as a peripheral component interconnect (PCI) bus. In an embodiment, the processor 1010 may provide input image data to the display device 1060. Hence, the display device 1060 may display an image based on the input image data provided from the processor 1010.

The memory device 1020 may store data needed to perform the operation of the electronic device 1000. The memory device 1020 may function as a working memory and/or a buffer memory for the processor 1010. For example, the memory device 1020 may include one or more volatile memory devices such as a dynamic random access memory (DRAM) device, a static random access memory (SRAM) device, and a mobile DRAM device.

The storage device 1030 may store data in response to control signals or data from the processor 1010. The storage device 1030 may include one or more non-volatile storages to retain the data even when the electronic device 1000 is powered off. In some embodiments, the storage device 1030 may include a solid state drive (SSD), a hard disk drive (HDD), a CD-ROM, or the like.

The I/O device 1040 may include input devices such as a keyboard, a keypad, a touchpad, a touch screen, and a mouse, and output devices such as a speaker and a printer. In an embodiment, the display device 1060 may be integrated with the I/O device 1040.

The power supply 1050 may supply power needed to perform the operation of the electronic device 1000. For example, the power supply 1050 may include a power management integrated circuit (PMIC). In an embodiment, the power supply 1050 may supply power to the display device 1060.

The display device 1060 may display images in response to control signals or data from the processor 1010. The display device 1060 may be connected to other components through the buses or other communication links.

In accordance with embodiments of the present disclosure, a display device is provided in which a problem of a relatively high luminance at some areas at a lower end portion of a display panel is mitigated or reduced.

Although the technical ideas supported by aspects of the present disclosure have been described in detail according to the above-described embodiments, it should be noted that the above embodiments are intended to illustrate examples, not to limit the scope of the present disclosure. In some aspects, those skilled in the art will understand that various modifications are possible within the scope of the technical ideas of the embodiments of the present disclosure.

What is claimed is:

1. A display device comprising:
- a display panel comprising a plurality of pixels;
- a scan driver configured to provide a scan signal to the display panel;
- a data driver configured to provide a data signal corresponding to each of the plurality of pixels to the display panel;
- a timing controller configured to control driving of the scan driver and the data driver; and
- a data converter configured to receive image data from the timing controller and generate the data signal from the image data based on a position of the pixel corresponding to the image data,
- wherein the data converter comprises:
  - a coefficient generator configured to output a correction coefficient based on the position of the pixel corresponding to the image data,
- wherein the display panel comprises a left area, a central area, and a right area based on a first direction, wherein the left area, the central area, and the right area are non-overlapping with one another, and the central area is between the left area and the right area in the first direction, and
- wherein:
- for first pixels corresponding to the left area from among the plurality of pixels, the coefficient generator is configured to generate correction coefficients which respectively decrease in the first direction toward a right side of the left area,
- for second pixels corresponding to the central area from among the plurality of pixels, the coefficient generator is configured to generate correction coefficients which respectively decrease in the first direction toward an edge of the central area or a second direction toward another edge of the central area, wherein the second direction is opposite the first direction, and
- for third pixels corresponding to the right area from among the plurality of pixels, the coefficient generator is configured to generate correction coefficients which respectively decrease in the second direction toward a left side of the right area.

2. The display device of claim 1, wherein the data converter comprises:
- a data generator configured to optionally generate converted data by converting the image data based on the correction coefficient.

3. The display device of claim 2, wherein:
- the data generator is configured to generate the converted data by applying the correction coefficient to the image data corresponding to the position of the pixel; and
- the coefficient generator is configured to store a lookup table indicating the correction coefficient.

4. The display device of claim 3, wherein the lookup table comprises a respective correction coefficient for each of the pixels belonging to the display panel.

5. The display device of claim 3, wherein:
- the pixels belonging to the display panel are divided into a plurality of groups, and
- the lookup table comprises a respective correction coefficient for each of the plurality of groups.

6. The display device of claim 3, wherein:
- the coefficient generator is configured to determine, with reference to the lookup table, the correction coefficient based on the position of the pixel in a first direction; and
- the lookup table comprises correction coefficients corresponding to respective positions of the pixels in the first direction.

7. The display device of claim 3, wherein:
- the coefficient generator is configured to determine, with reference to the lookup table, the correction coefficient based on;
  - the position of the pixel in the first direction or the second direction, and
  - a position of the pixel in a third direction different from the first direction and the second direction; and
- the lookup table comprises correction coefficients corresponding to:
  - respective positions of the pixels in the first direction or the second direction, and
  - respective positions of the pixels in the third direction.

8. The display device of claim 3, wherein, among the plurality of pixels, the coefficient generator is configured to:
- determine a correction coefficient of 1 for pixels positioned at a first portion of the display panel; and
- determine respective correction coefficients for pixels positioned at a second portion of the display panel based on respective positions of the pixels in the second portion.

9. The display device of claim 2, wherein the data generator is configured to generate the converted data by multiplying the image data by the correction coefficient.

10. The display device of claim 3, wherein the lookup table is determined in an operation of inspecting the display panel.

11. The display device of claim 2, wherein the data converter further comprises a digital-to-analog converter configured to convert the converted data into the data signal.

12. The display device of claim 2, wherein for the plurality of pixels, the coefficient generator is configured to generate correction coefficients which respectively decrease based on positions of the plurality of pixels in a direction.

13. The display device of claim 2, wherein the data generator is configured to generate the converted data by adding the image data and the correction coefficient.

14. A display device comprising:

a display panel comprising a plurality of pixels;

a scan driver configured to provide a scan signal to the display panel;

a data driver configured to provide a data signal corresponding to each of the plurality of pixels to the display panel; and a timing controller configured to:

control driving of the scan driver and the data driver; and generate the data signal from image data based on a position of the pixel corresponding to the image data, wherein the timing controller is configured to generate the data signal by converting the image data, wherein the timing controller comprises:

a coefficient generator configured to output a correction coefficient based on the position of the pixel corresponding to the image data;

wherein the display panel comprises a left area, a central area, and a right area based on a first direction, wherein the left area, the central area, and the right area are non-overlapping with one another, and the central area is between the left area and the right area in the first direction, and wherein:

for first pixels corresponding to the left area from among the plurality of pixels, the coefficient generator is configured to generate correction coefficients which respectively decrease in the first direction toward a right side of the left area, for second pixels corresponding to the central area from among the plurality of pixels, the coefficient generator is configured to generate correction coefficients which respectively decrease in the first direction toward an edge of the central area or a second direction toward another edge of the central area, wherein the second direction is opposite the first direction, and for third pixels corresponding to the right area from among the plurality of pixels, the coefficient generator is configured to generate correction coefficients which respectively decrease in the second direction toward a left side of the right area.

15. The display device of claim 14, wherein the timing controller comprises:

a data generator configured to optionally generate converted data by converting the image data based on the correction coefficient; and a digital-to-analog converter configured to convert the converted data into the data signal.

16. The display device of claim 15, wherein:

the data generator is configured to generate the converted data by applying the correction coefficient to the image data corresponding to the position of the pixel; and the coefficient generator is configured to store a lookup table indicating the correction coefficient.

17. The display device of claim 16, wherein:

the pixels belonging to the display panel are divided into a plurality of groups, and the lookup table comprises a respective correction coefficient for each of the plurality of groups.

18. The display device of claim 15, wherein the data generator is configured to generate the converted data by multiplying the image data by the correction coefficient.

19. An electronic device, comprising:

a processor to provide input image data; and a display device to display an image based on the input image data, wherein the display device comprises:

a display panel comprising a plurality of pixels;

a scan driver configured to provide a scan signal to the display panel;

a data driver configured to provide a data signal corresponding to each of the plurality of pixels to the display panel;

a timing controller configured to control driving of the scan driver and the data driver; and a data converter configured to receive image data from the timing controller and generate the data signal from the image data based on a position of the pixel corresponding to the image data, wherein the data converter comprises:

a coefficient generator configured to output a correction coefficient based on the position of the pixel corresponding to the image data, wherein the display panel comprises a left area, a central area, and a right area based on a first direction, wherein the left area, the central area, and the right area are non-overlapping with one another, and the central area is between the left area and the right area in the first direction, and wherein:

for first pixels corresponding to the left area from among the plurality of pixels, the coefficient generator is configured to generate correction coefficients which respectively decrease in the first direction toward a right side of the left area, for second pixels corresponding to the central area from among the plurality of pixels, the coefficient generator is configured to generate correction coefficients which respectively decrease in the first direction toward an edge of the central area or a second direction toward another edge of the central area, wherein the second direction is opposite the first direction, and for third pixels corresponding to the right area from among the plurality of pixels, the coefficient generator is configured to generate correction coefficients which respectively decrease in the second direction toward a left side of the right area.

* * * * *